March 20, 1945.          E. A. ROCKWELL          2,372,015
CONTROLLING MEANS FOR AUTOMOTIVE VEHICLES
Original Filed March 26, 1940     2 Sheets-Sheet 1
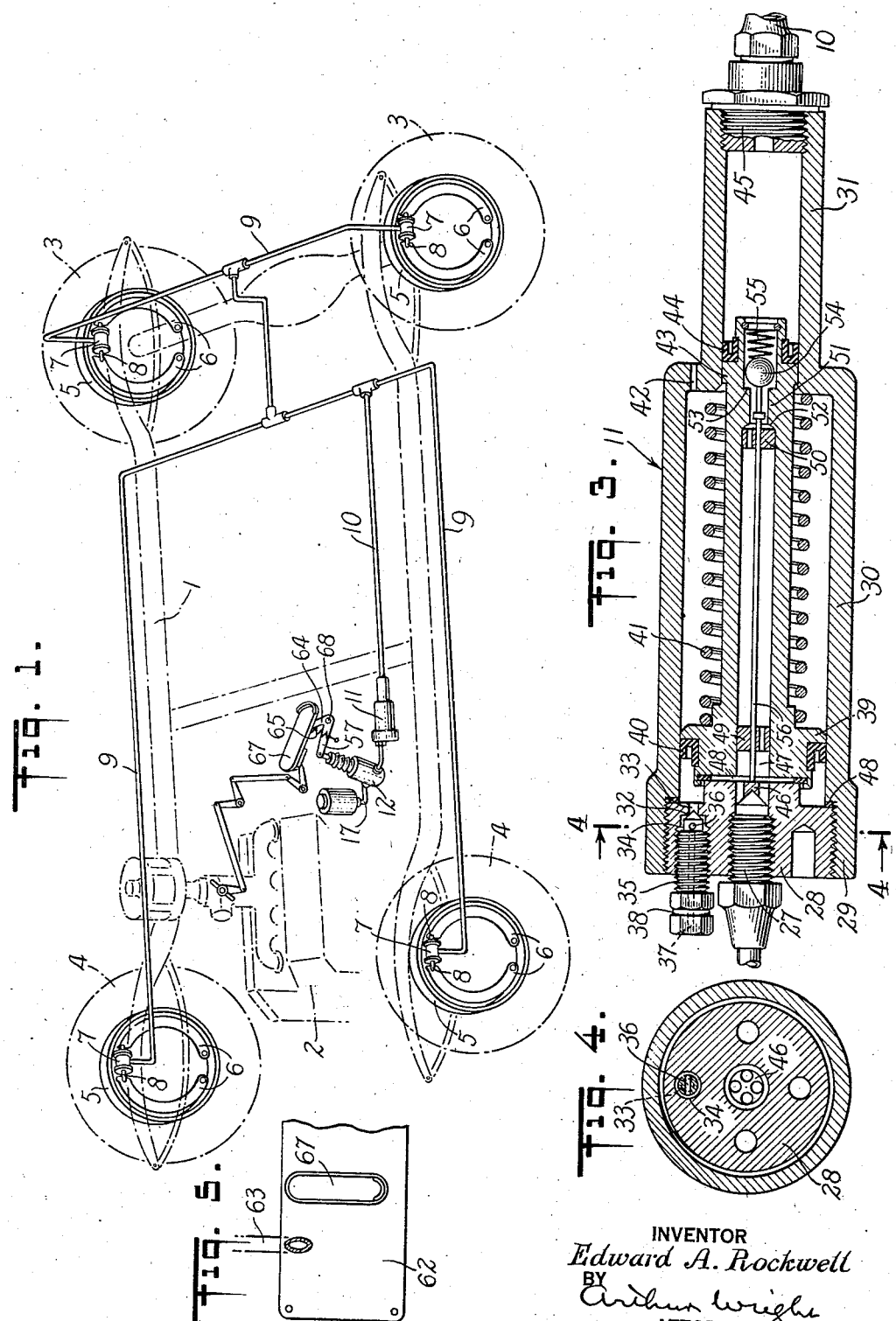
INVENTOR
*Edward A. Rockwell*
BY
*Arthur Wright*
ATTORNEY

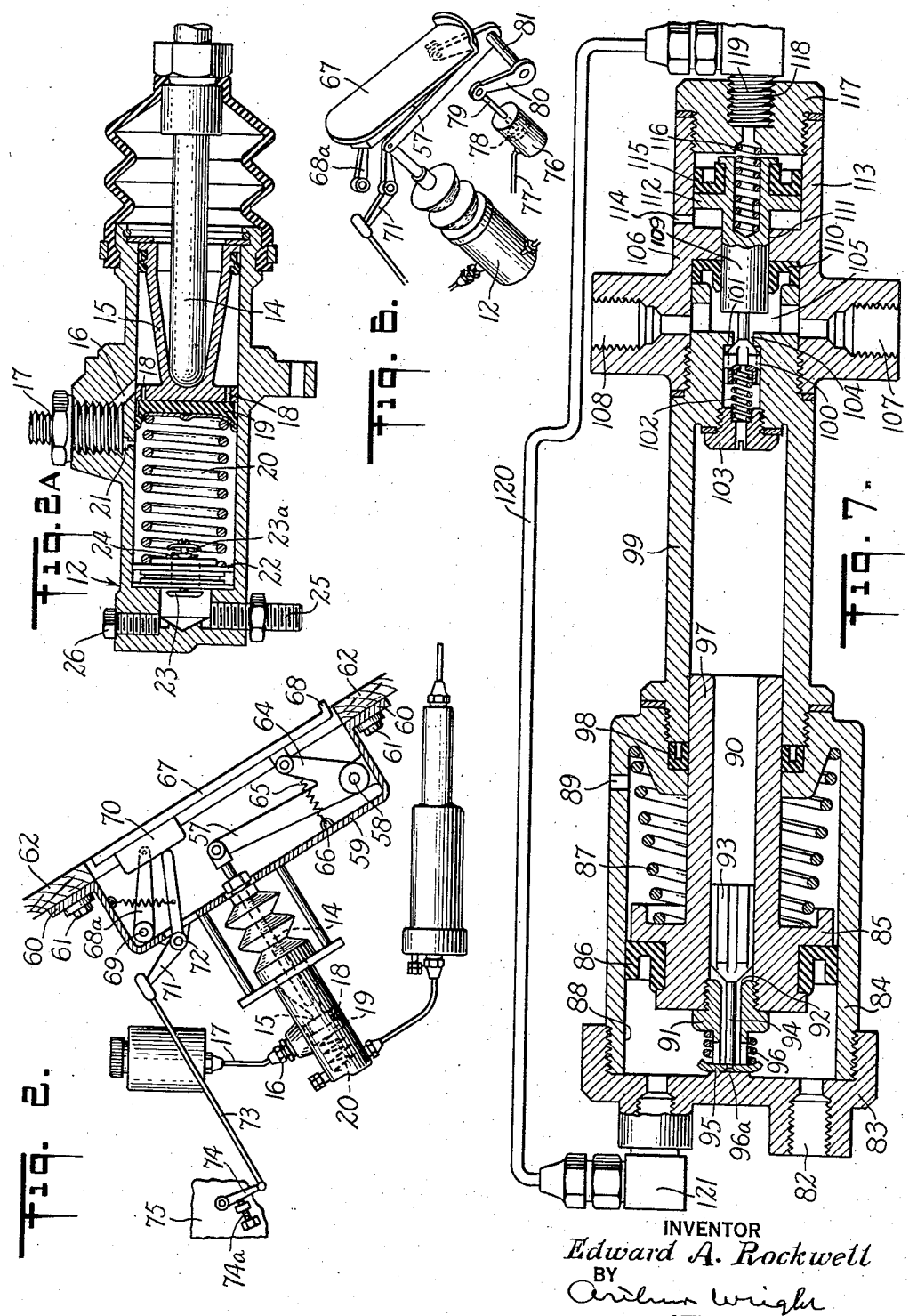

Patented Mar. 20, 1945

2,372,015

UNITED STATES PATENT OFFICE 2,372,015

CONTROLLING MEANS FOR AUTOMOTIVE VEHICLES

Edward A. Rockwell, West Hartford, Conn.

Original application March 26, 1940, Serial No. 326,040, now Patent No. 2,300,136, dated October 27, 1942. Divided and this application June 13, 1941, Serial No. 397,898

14 Claims. (Cl. 60—54.5)

My invention relates particularly to an apparatus designed for controlling the operation of automotive vehicles driven by internal combustion engines or from any other source of power.

This is a divisional application of my application upon Control for automotive vehicles, Ser. No. 326,040, filed March 26, 1940, Patent No. 2,300,136, granted October 27, 1942.

The object of my invention is to provide an apparatus giving an effective control for automotive vehicles by means of which the manual operation thereof is simplified. A further object is to provide means whereby the manual power applied for operating one or more of the automotive accessories is controlled in such a manner as to initially apply low pressure liquid and thereafter, by gradual increase in the pressure, to subsequently apply a higher pressure liquid to the same. This change from low to high pressure is for the purpose of reducing the distance which the pedal is required to travel, thus keeping the pedal at all times in a position near to the level of the floor-board in which the pedal is mounted. This construction is especially advantageous as applied to the operation of brakes. A further object is to provide a hydraulic means for moving the apparatus which controls the brake or other device to be moved thereby, the said brake, etc., being provided also with a hydraulic connection so as to produce a reaction from the hydraulic liquid applied to the brake or other device back to the hydraulic means which operates the controlling apparatus. In this way the extent of the hydraulic pressure applied to the brake or other device is arranged at all times to provide a reaction pressure in the hydraulic line which operates the controlling apparatus so that the pressure applied to the brake or other device is ascertainable and, furthermore, prevents the application of unwarrantably high pressures in the operation of the brake or other device. Further objects of my invention will appear from the detailed description of the same hereinafter.

While my invention is capable of being embodied in many different forms, by way of illustration I have shown only certain forms thereof in the accompanying drawings, in which—

Fig. 1 is a diagrammatic perspective of an apparatus made in accordance with my invention;

Fig. 2 is a vertical section of the manual actuating unit for controlling the same;

Fig. 2a is a longitudinal section of the master cylinder;

Fig. 3 is a longitudinal section of the pressure converter used in connection therewith;

Fig. 4 is a section substantially on line 4—4 of Fig. 3;

Fig. 5 is an elevation of the floor-board in front of the driver's seat, showing the manual actuating control above referred to;

Fig. 6 is a diagrammatic elevation of a modified form of my invention; and

Fig. 7 is a longitudinal section of a modified form of converter which may be used therein.

Referring first to Figs. 1 to 5, in carrying out my invention I may provide an automobile chassis 1 having an internal combustion engine 2 arranged to drive in the usual way rear wheels 3, the front of the chassis being supported upon front wheels 4. Each of said wheels is provided with a brake-drum 5 having two semicircular brake-shoes 6 pivoted at their lower ends, said brake-shoes being adapted to be operated by means of a wheel brake-cylinder 7 having two fluid operated pistons 8 therein connected to the upper ends of said brake-shoes in the usual way. Piping 9 connects all of these brake cylinders together and a pipe 10 leads therefrom to a pressure converter 11 which in turn is connected to a master cylinder 12 by a hydraulic connection. The master cylinder 12 can be any desired type of master cylinder but may, for example, be of the character shown in the Boughton Patent No. 1,997,100, granted April 9, 1935. Or, instead, the master cylinder may be a Loughead construction, as shown in the drawings, comprised of a piston 15, operated by a rod 14, said cylinder 12 having a port 16 with a storage supply of fluid through a pipe 17. The piston 15 has longitudinal ports 18 which are adapted to transmit the fluid therethrough due to the suction created on the right in the withdrawal action of the piston 15, which liquid, in the same way, passes by the lip of a rubber cup 19 which tends to move to the right by reason of a coil spring 20 and which, in the right end of its path, permits the return of liquid by a port 21 to the storage supply. The coil spring 20 rests at the other end upon a valve supporting ring 22. The said ring has therein a double check valve 23, 23a normally pressed to the right by a small coil spring 24. An outlet fitting 25, leading to the brakes, is located in the end of the master cylinder. A bleeder plug 26 is also located in the end of the master cylinder. The liquid discharged under pressure from the master cylinder 12, as a result of the manual operation thereof, passes into an inlet opening 27 in a screw-cap 28 in the pressure converter 11. The said cap 28 is carried in the end of a converter housing 29 having a large cylinder 30 and a small cylinder 31 therein. The said cap is furthermore provided with an air bleeder opening 32 communicating with the larger cylinder 30 and is normally closed by a conical end 33 of a screw plug 34 screwed into a screw sleeve 35 screw-threaded into said cap 28. The screw plug 34 has transverse ports 36 therein which communicate with a longitudinal port 37 in the same communicating with the outer air. The plug 34 and sleeve 35 serve to lock the conical end 33 on its seat normally with the aid of a lock washer 38. Within the large cylinder 30 there is a large piston 39 sealed by a sealing ring 40 of rubber or any other desired material, the said piston 39 being normally forced towards the left in Fig. 3 by a strong compression spring 41, the space to the right of the piston 39 being vented to the outer air by a breather opening 42. The small cylinder 31 carries within the same a small piston 43 integral with the piston 39 and which carries on its right-hand end a rubber seal ring 44. The small cylinder 31 is connected at said end thereof by a screw-threaded coupling 45 to the said pipe 10. The liquid as initially received through the port 27 passes through a ported stop boss 46 until it reaches an internal cylinder 47 within the piston 39. In advance of said cylinder 47 to the left there is carried a sealing gasket 48 cut away at the center to allow a small effective initial pressure tending to move the large piston 39, the opening in said gasket being slightly larger than the internal diameter of the cylinder 31, said cylinder 47 having two ported guides 49 and 50. The end of the cylinder 47 has a constricted portion 51 provided with a shoulder 52 for the plug 50 and a shoulder 53 which acts as a seat for a ball valve 54 pressed into closed position by a spring 55, one end of which is supported within the right-hand end of the small piston 43. This ball valve 54 in the retracted position of the large piston 39 is unseated by means of a rod 56 passing through the cylinder 47 and guides 49 and 50. The said rod 56 is of such a length that in the retracted position of the large piston 39 the left-hand end of the rod 56 will contact with the face of the boss 46 and press the ball valve 54 off its seat. In the subsequent movement of the piston 39 to the right the ball valve 54 will become seated due to the movement of the rod 56 away from the cap 28.

The said link 14, for operating the master cylinder 12, is connected to one end of a bell crank lever 57 carried by a pivot 58 on a box 59 having a flange 60 secured by screws 61 to an inclined stationary floor-board 62 located in front of the driver's seat and through which projects the usual steering column 63. Another arm 64 of the bell crank lever 57 is normally under a slight pressure downwardly by means of a tension coil spring 65 connected between said arm 64 and a hook 66 on the box 59. Furthermore, pivoted to said arm 64 there is a pedal 67 having a heel-supporting flange 68 at the lower portion thereof. As indicated in Figs. 2 and 5, the pedal 67 is flush with the surface of the floor-board 62. It will be noted that the arm 64 is thus pivoted to the lower portion of the pedal 67, the upper portion of said pedal being pivotally connected by means of a block 70 to an arm 68a carried by a pivot 69 on the box 59. The block 70 also rests against the end of a bell crank lever 71 supported by a pivot 72 on the box 59, to which is connected a throttle rod 73 leading to a throttle lever 74 having an adjustable stop 74a on an engine manifold 75. It will be noted from Fig. 5 that the only manual control aside from the steering column 63 is preferably the single pedal 67 which operates the brake and throttle, no clutch lever being needed as it will be understood that any desired type of automatically operating clutch, as for instance a hydraulically driven clutch, such as is shown in the Lysholm Patent No. 1,934,936, granted November 14, 1933, free from manual control, can be used for this purpose. Thus it will be seen that the floor-board 62 is free from the presence of any clutch operating element and the pedal 67 is flush with the floor-board 62, giving maximum space for the presence of the driver's feet. However, it will be understood that a clutch lever may pass through the floor-board 62 with the usual type of clutch but this, of course, could not have the advantages of the other construction just referred to.

Referring to the modified form of my invention in Fig. 6, the construction is the same as that previously described and shown in the preceding figures except in this instance instead of the spring 65 I have provided, for accomplishing a similar purpose to said spring but more effectively, a vacuum cylinder 76 connected by a pipe 77 to said engine manifold. Within the cylinder 76 there is a piston 78 which is connected by a link 79 to an arm 80 which is tight on a shaft 81 on which the bell crank lever 57 is carried so that in this way the bell crank lever 57 and arm 80 operate in unison.

In the modified form of the converter shown in Fig. 7, the liquid from the master cylinder enters through a port 82 in a cap 83 on a large cylinder 84. The cylinder 84 has therein a large movable wall or piston 85 provided with a sealing ring 86 normally urged towards the left by a strong spring 87 in a low pressure cylinder chamber 88 connected to the outer air by a breather opening 89. The said large piston 85, furthermore, has a longitudinal passageway 90 therein in which there is screw-threaded a sleeve 91, the right-hand end 92 of which serves as a seat for a valve 93 which is connected to a rod 94 passing through the screw-threaded sleeve 91 but smaller than the opening in said sleeve. Upon the left end of said rod 94 there is fixed a ring 95 as a support for a spring 96 resting at its other end on the sleeve 91 so as to normally move the valve 93 to the left. The ring 95 is adapted to contact with a boss 96a on the inner face of the cap 83 so as to unseat the valve 93 when the large piston 85 is in the retracted position to the left. At the right the said piston 85 carries a pressure increasing device such as a smaller piston 97 extending through the end of the large cylinder 84, which latter carries a rubber ring seal 98. This small piston 97 passes, thence, into a high pressure small cylinder 99 screw-threaded to the cylinder 84. The other end of the cylinder 99 is normally closed by a valve 100 pressed against a seat 101 by a spring 102 supported by a ported screw-threaded plug 103. Said valve 100 controls the discharge of pressure liquid through a port 104 into a chamber 105 in a housing 106 connected hydraulically by openings 107 and 108 to the wheel brakes for operating the latter. The said chamber 105, furthermore, is adapted to receive a plunger 109 which is sealed in the chamber 105 by a rubber ring seal 110. This small plunger 109 fits in an opening 111 through which it passes so as to be connected to a supplemental plunger or piston 112 operating in a cylinder 113 connected by a breather opening 114 to the outer air. On the right face of the piston 112 there is a rubber sealing ring 115 and within said piston 112 there is a coil spring 116 seated at the other end on a screw cap 117 on the end of the cylinder 113. The spring 116 provides a yielding support for the piston 112 but is so positioned as to normally not unseat the valve 100. The said cap has a threaded opening 118 in which there is screw-threaded a fitting 119 connected by a hydraulic line or pipe 120 to a fitting 121 screw-threaded into the cap 83.

In the operation of my invention, referring first to Figs. 1 to 5, when it is desired to operate the automobile the engine 2 is started in the usual way after which, where an automatic hydraulic clutch is used, no manual clutch operation is required, but the automobile may now be driven and controlled by the operation of the single pedal 67. By the tilting of the pedal 67 forwardly at the top the throttle is controlled to accelerate the car and by the release of the same, followed by the tilting forwardly of the lower end of the pedal 67, the brakes will be brought into operation. This operation of the brakes is brought about through the pressure converter 11 in the following manner. Initially the liquid delivered from the master cylinder 12 passes into the opening 27 and thence through the passageway 47 past the valve 54 so as to move the brake shoes 6 into a position adjacent the brake-drums 5. When the manual pressure reaches this point and is thereafter increased, the result is to first seat the valve 54 by moving the piston 39 to the right, gradually forcing forward the liquid trapped in the small cylinder 31. This is followed by the further movement of the large piston 39 to the right in Fig. 3, thus converting the low pressure of the liquid at the left of said piston 39 to a high pressure liquid at the right of the small piston 43, and thus supplying the brakes with this high pressure liquid. Upon the release of the brakes the piston 39 returns to its initial position, simultaneously unseating the valve 54 and allowing an excess liquid to return in the reverse direction to the master cylinder 12. During this action of the brakes the tension spring 65 will have initially partially seated the brake-shoes 6 in position, thus tending to prevent any sudden or sharp action of the brakes, and also preventing delay in the operation of the same by the manual effort that has been applied. Also, the spring 65 will exert some action towards putting on the brakes in the final releasing movement of the accelerator.

The modification of my invention shown in Fig. 6 operates in a similar way. In this instance, however, the vacuum in the cylinder 76 will take the place of the action of the tension spring 65 to partially initially set the brake-shoes 6. The vacuum in this instance exerts some action towards putting on the brakes when the foot is being finally released from the depression of the accelerator when the engine is running. This form of my invention also has the effect of moving the foot up, due to the spring 29, when the load and vacuum are low, thus acting as a governor.

In the operation of the modification of my invention shown in Fig. 7, the liquid from the master cylinder enters the converter through the port 82 in the enclosure 84 and initially builds up a pressure within the cylinder 99 which, however, substantially does not move the large piston 85 due to the valve 93 being open. The initial built-up pressure, however, passes by the pipe 120 to the right face of the piston 112 which operates the plunger 109 so as to unseat the valve 100 and thus supply the liquid from the chamber 105 through the ports 107 and 108 to the wheel brakes for initially moving them into a position adjacent the brake-drums. As this manual pressure increases, however, the increased pressure on the left face of the large piston 85 will move the latter to the right, thus closing the valve 93 and thereafter producing a differentially greater pressure in the cylinder 99 than in the chamber 88 which is supplied, as desired, past the valve 100 to the brakes. In this way, due to the gradual opening of the valve 100 as the manual pressure increases, a gradual transition from the initial manual pressures applied for moving the brakes into position is produced, up to the high pressures produced by the piston 97 used for producing the braking action on the brake-drums, while a reaction from the pressure in the chamber 105 is exerted through the plungers 109, 112 on the liquid in the line 120 and thus on the manual operating means.

There is a reaction from the plungers 109, 112 and pipe 120 as will be obvious from the fact that the liquid in the chamber 105 exerts a reaction pressure on the plunger 109 and thence through the pipe 120 to the chamber 88 and thence back to the manual means, and this pressure is just as effective as a reaction pressure derived from the piston 85. Upon the release of the brakes the piston 85 returns to its initial position, opening the valve 93 for liquid compensation and closing the valve 100 due to its release by the plunger 109.

While I have described my invention above in detail I wish it to be understood that many changes may be made therein without departing from the spirit of the same.

I claim:

1. A pressure converter comprising a hydraulic connection for operating the converter, a low pressure cylinder, a high pressure cylinder, pistons connected together in said cylinders, an initially open valve having a movable valve element movable with regard to said pistons, adapted to permit the passage initially of low pressure liquid and close thereafter to supply a high pressure liquid by the movement of said pistons, and hydraulically operated valve means operated by said first mentioned connection adapted to produce a transition from the low pressure to the high pressure liquid gradually.

2. A pressure converter comprising a hydraulic connection for operating the converter, a low pressure cylinder, a high pressure cylinder, pistons connected together in said cylinders, an initially open valve having a movable valve element movable with regard to said pistons, adapted to permit the passage initially of low pressure liquid and close thereafter to supply a high pressure liquid by the movement of said pistons, and hydraulically operated valve means operated by said first mentioned connection adapted to produce a transition from the low pressure to the high pressure liquid gradually, comprising a third piston and another valve adapted to be operated by the third piston initially before the closing of said first-mentioned valve.

3. A pressure converter comprising a hydraulic connection for operating the converter, a low pressure cylinder, a high pressure cylinder, pistons connected together in said cylinders, an initially open valve having a movable valve element movable with regard to said pistons, adapted to permit the passage initially of low pressure liquid and close thereafter to supply a high pressure liquid by the movement of said pistons, and hydraulically operated valve means operated by said first mentioned connection adapted to produce a transition from the low pressure to the high pressure liquid gradually, comprising a third piston and another valve adapted to be operated by the third piston initially before the closing of said first mentioned valve, said third piston being adapted to be operated initially before the operation of said other pistons.

4. A pressure converter comprising a hydraulic connection for operating the converter, a low pressure cylinder, a high pressure cylinder, pistons connected together in said cylinders, an initially open valve having a movable valve element movable with regard to said pistons, adapted to permit the passage initially of low pressure liquid and close thereafter to supply a high pressure liquid by the movement of said pistons, and hydraulically operated valve means operated by said first mentioned connection adapted to produce a transition from the low pressure to the high pressure liquid gradually, comprising a third piston and another valve adapted to be operated by the third piston initially before the closing of said first mentioned valve, said third piston being adapted to be operated initially before the operation of said other pistons and said first mentioned valve being located in the high pressure piston.

5. A pressure converter comprising a hydraulic connection for operating the converter, a low pressure cylinder, a high pressure cylinder, pistons connected together in said cylinders, an initially open valve having a movable valve element movable with regard to said pistons, adapted to permit the passage initially of low pressure liquid and close thereafter to supply a high pressure liquid by the movement of said pistons, and hydraulically operated valve means operated by said first mentioned connection adapted to produce a transition from the low pressure to the high pressure liquid gradually, comprising a third piston and another valve adapted to be operated by the third piston initially before the closing of said first mentioned valve, said third piston being adapted to be operated initially before the operation of said other pistons, said means having a passageway leading to said third piston in which passage the other valve is seated, and means for unseating said first mentioned valve in the retracted position of the low and high pressure pistons.

6. A pressure converter comprising a hydraulic connection for operating the converter, a low pressure cylinder, a high pressure cylinder, pistons connected together in said cylinders, an initially open valve having a movable valve element movable with regard to said pistons, adapted to permit the passage initially of low pressure liquid and close thereafter to supply a high pressure liquid by the movement of said pistons, and hydraulically operated valve means operated by said first mentioned connection adapted to produce a transition from the low pressure to the high pressure liquid gradually, comprising a third piston and another valve adapted to be operated by the third piston initially before the closing of said first mentioned valve, said third piston being adapted to be operated initially before the operation of said other pistons, said means having a passageway leading to said third piston in which passage the other valve is seated, and said first valve being located in the high pressure piston, and means for unseating said first mentioned valve in the retracted position of the low and high pressure pistons.

7. In combination, valve means for controlling the application of pressure liquid, an enclosure comprising a cylinder containing a movable wall controlled by said pressure liquid and valve means, a master cylinder controlling the movement of the valve means, a hydraulic connection and cylinder receiving liquid provided by the movement of the movable wall so as to be delivered to a part to be moved thereby, a hydraulic means, including a passageway and a differential piston having a cylinder connected to convey pressure from the piston to said connection and to the said master cylinder adapted to convey a reaction through said hydraulic means to the said master cylinder, and a shut off valve located at and operated by the differential piston for cutting off the liquid from the master cylinder to the part to be moved.

8. In combination, valve means for controlling the application of pressure liquid, an enclosure comprising a cylinder containing a movable wall controlled by said pressure liquid and valve means, a master cylinder controlling the movement of the valve means, a cylinder having a pressure-increasing device connected to said movable wall, a hydraulic connection receiving pressure liquid provided by the movement of the movable wall so as to be delivered to a part to be moved thereby, a hydraulic means, including a passageway and a differential piston connected to convey pressure from the the piston to said connection and to the said master cylinder adapted to convey a reaction through said hydraulic means to the said master cylinder, and a shut off valve located at and operated by the differential piston for cutting off the liquid from the master cylinder to the part to be moved.

9. In combination, valve means for controlling the application of pressure liquid, an enclosure comprising a cylinder containing a movable wall controlled by said pressure liquid and valve means, a master cylinder controlling the movement of the valve means, a cylinder having a pressure-increasing device, comprising a piston, connected to and having a smaller diameter than said movable wall, a hydraulic connection receiving pressure liquid provided by the movement of the movable wall so as to be delivered to a part to be moved thereby, a hydraulic means, including a passageway and a differential piston connected to convey pressure from the piston to said connection and to the said master cylinder, adapted to convey a reaction through said hydraulic means to the said master cylinder, and a shut-off valve located at and operated by the differential piston for cutting off the liquid from the master cylinder to the part to be moved.

10. In combination, valve means for controlling the application of pressure liquid, an enclosure comprising a cylinder containing a movable wall controlled by said pressure liquid and valve means, a master cylinder controlling the movement of the valve means, a cylinder having a pressure-increasing device connected to said movable wall, a hydraulic connection receiving pressure liquid provided by the movement of the movable wall so as to be delivered to a part to be moved thereby, a hydraulic means, including a passageway and a differential piston connected to convey pressure from said connection to the said master cylinder adapted to convey a reaction through said hydraulic means to the said master cylinder, and a shut-off valve located at and operated by the differential piston for cutting off the liquid from the master cylinder to the part to be moved, said valve means comprising a valve located in the movable wall adapted to initially convey the pressure liquid past the movable wall.

11. In combination, valve means for controlling the application of pressure liquid, an enclosure comprising a cylinder containing a movable wall controlled by said pressure liquid and valve means, a master cylinder controlling the movement of the valve means, a cylinder having a pressure-increasing device, comprising a piston, connected to and having a smaller diameter than said movable wall, a hydraulic connection receiving pressure liquid provided by the movement of the movable wall so as to be delivered to a part to be moved thereby, a hydraulic means, including a passageway and a differential piston connected to convey pressure from said connection to the said master cylinder adapted to convey a reaction through said hydraulic means to the said master cylinder, and a shut-off valve located at and operated by the differential piston for cutting off the liquid from the master cylinder to the part to be moved, said valve means comprising a valve located in the movable wall adapted to initially convey the pressure liquid past the movable wall.

12. In combination valve means for controlling the application of pressure liquid, an enclosure comprising a cylinder containing a movable wall controlled by said pressure liquid and valve means, a master cylinder controlling the movement of the valve means, a cylinder having a pressure-increasing device connected to said movable wall, a hydraulic connection receiving pressure liquid provided by the movement of the movable wall so as to be delivered to a part to be moved thereby, a hydraulic means, including a passageway and a differential piston connected to convey pressure from said connection to the said master cylinder adapted to convey a reaction through said hydraulic means to the said master cylinder, and a shut-off valve located at and operated by the differential piston for cutting off the liquid from the master cylinder to the part to be moved, said valve means comprising a valve located in the movable wall adapted to initially convey the pressure liquid past the movable wall and said shut-off valve being provided for controlling the flow through the first mentioned valve.

13. In combination, valve means for controlling the application of pressure liquid, an enclosure comprising a cylinder containing a movable wall controlled by said pressure liquid and valve means, a master cylinder controlling the movement of the valve means, a cylinder having a pressure-increasing device, comprising a piston, connected to said movable wall, a hydraulic connection receiving pressure liquid provided by the movement of the movable wall so as to be delivered to a part to be moved thereby, a hydraulic means, including a passageway and a differential piston connected to convey pressure from said connection to the said master cylinder adapted to convey a reaction through said hydraulic means to said master cylinder, and a shut-off valve located at and operated by the differential piston for cutting off the liquid from the master cylinder to the part to be moved, said valve means comprising a valve located in the movable wall adapted to initially convey the pressure liquid past the movable wall and said shut-off valve being provided for controlling the flow through the first-mentioned valve.

14. A liquid pressure converter, comprising a hydraulic connection for operating the converter, and a second hydraulic connection leading from the converter to a device for the utilization of hydraulic pressure, a cylinder, pistons connected together in said cylinder, comprising a relatively large pressure-responsive area and a relatively small pressure-responsive area respectively, means including a valve for effecting a flow of liquid to both pressure-responsive areas initially, and an additional valve controlling the second hydraulic connection having a piston for actuating the same and having a hydraulic communication with the first-mentioned connection, the said additional valve also having associated therewith a pressure-reaction area in hydraulic communication with the said second connection.

EDWARD A. ROCKWELL.